US011151372B2

(12) United States Patent
Kakrana et al.

(10) Patent No.: US 11,151,372 B2
(45) Date of Patent: Oct. 19, 2021

(54) SYSTEMS, METHODS AND COMPUTER PROGRAM PRODUCTS FOR AUTOMATICALLY EXTRACTING INFORMATION FROM A FLOWCHART IMAGE

(71) Applicant: Elsevier, Inc., New York, NY (US)

(72) Inventors: Atul Kakrana, Newark, DE (US); Kaushik Raha, Jeffersonville, PA (US)

(73) Assignee: ELSEVIER, INC., New York, NY (US)

( * ) Notice: Subject to any disclaimer, the term of this patent is extended or adjusted under 35 U.S.C. 154(b) by 54 days.

(21) Appl. No.: 16/597,584

(22) Filed: Oct. 9, 2019

(65) Prior Publication Data

US 2021/0110150 A1 Apr. 15, 2021

(51) Int. Cl.
*G06K 9/00* (2006.01)
*H04N 13/261* (2018.01)
*G06K 9/18* (2006.01)

(52) U.S. Cl.
CPC ..... *G06K 9/00463* (2013.01); *G06K 9/00449* (2013.01); *G06K 9/00456* (2013.01);
(Continued)

(58) Field of Classification Search
CPC ........... G06K 9/00449; G06K 9/00456; G06K 9/00463; G06K 9/00469; G06K 9/18; G06K 2209/01; H04N 13/261
(Continued)

(56) References Cited

U.S. PATENT DOCUMENTS 5,293,469 A 3/1994 Outa et al.
5,522,022 A 5/1996 Rao et al.
(Continued)

FOREIGN PATENT DOCUMENTS

CN 107944341 A 4/2018
CN 108280430 A 7/2018
(Continued)

OTHER PUBLICATIONS

Bintu, et al. (Flowchart Knowledge Extraction on Image Processing), pp. 4075-4082, IEEE. (Year: 2008).*
(Continued)

*Primary Examiner* — Daniel G Mariam
(74) *Attorney, Agent, or Firm* — Dinsmore & Shohl LLP

(57) ABSTRACT

A method of extracting information from a flowchart image comprising a plurality of closed-shaped data nodes having text enclosed within, connecting lines connecting the plurality of closed-shaped data nodes and free text adjacent to the connecting lines includes receiving the flowchart image, detecting the closed-shaped data nodes, localizing the text enclosed within the closed-shaped data nodes, and masking the localized text to generate an annotated image. Lines in the annotated image are the detected to reconstruct them as closed-shaped data nodes and connecting lines. A tree frame with the plurality of closed-shaped data nodes and the connecting lines is extracted. The free text is then localized. Chunks of the free text oriented and positioned proximally together are assembled into text blocks using an orientation-based two-dimensional clustering.

20 Claims, 10 Drawing Sheets

(52) U.S. Cl.
CPC .......... *G06K 9/00469* (2013.01); *G06K 9/18* (2013.01); *H04N 13/261* (2018.05); *G06K 2209/01* (2013.01)

(58) Field of Classification Search
USPC ........................................................ 382/176
See application file for complete search history.

(56) References Cited

U.S. PATENT DOCUMENTS

| | | |
|---|---|---|
| 7,200,271 B2 | 4/2007 | Boose et al. |
| 9,087,236 B2 | 7/2015 | Dhoolia et al. |
| 9,092,696 B2 | 7/2015 | Zhang |
| 9,934,431 B2 | 4/2018 | Prebble |
| 9,977,956 B2 | 5/2018 | Prebble |
| 2004/0090439 A1 | 5/2004 | Dillner |
| 2012/0213429 A1 | 8/2012 | Vasudevan et al. |
| 2017/0039193 A1 | 2/2017 | Mustafi et al. |
| 2018/0101724 A1 | 4/2018 | Fingado |

FOREIGN PATENT DOCUMENTS

| | | |
|---|---|---|
| CN | 109359594 A | 2/2019 |
| CN | 109389050 A | 2/2019 |
| CN | 109492638 A | 3/2019 |
| CN | 109710240 A | 5/2019 |
| KR | 20110070662 A | 6/2011 |
| KR | 20190002328 A | 1/2019 |

OTHER PUBLICATIONS

Bintu G. Vasudevan et al., Flowchart knowledge extraction on image processing, IEEE.org | IEEE Xplore Digital Library | IEEE-SA | IEEE Spectrum | More Sites, Jun. 1-8, 2008.
PCT/CN2020/127692 Notification of Transmittal of the International Search Report and the Written Opinion of the International Searching Authority, dated Feb. 18, 2021.

\* cited by examiner

SYSTEMS, METHODS AND COMPUTER PROGRAM PRODUCTS FOR AUTOMATICALLY EXTRACTING INFORMATION FROM A FLOWCHART IMAGE

TECHNICAL FIELD

The present specification generally relates to systems, methods and computer program products for retrieving information from images using computer vision techniques and, more specifically, to systems, methods and computer program products for automatically extracting information from a flowchart image using computer vision techniques.

BACKGROUND

Flowcharts are commonly used in a variety of fields and represent human curated knowledge in a succinct and structured form. Medical and scientific fields are replete with flowcharts on symptoms, observations and diagnosis which can be used for clinical decision support, content search systems, automated question generation, etc. Images of flowcharts may have different shapes, sizes, flow types, formats, colors, content density, quality, fonts, image resolution, etc. Accordingly, it is desirable to have ways for complete and accurate extraction of information from flowcharts so that the information can be compiled into searchable and interactive format for subsequent benefit in preparing, for example, machine-learnable assets and interactive knowledge bases.

SUMMARY

The present specification relates to systems, methods and computer program products for automatically extracting information from a flowchart image comprising one or more of: a plurality of closed-shaped data nodes having text enclosed within, connecting lines connecting one or more of the plurality of closed-shaped data nodes and free text adjacent to the connecting lines. In one embodiment, a method for extracting information from a flowchart image starts with receiving the flowchart image as an electronic image file. The method includes detecting a plurality of closed-shaped data nodes and localizing text enclosed within the plurality of closed-shaped data nodes. The localized text within the plurality of closed-shaped data nodes is masked to generate an annotated image. A statistical size distribution of the dimensions of characters in the free text is then generated to identify the connecting lines. The method further includes detecting lines in the annotated image to reconstruct them as closed-shaped data nodes and connecting lines. Then, the method includes extracting a tree frame with the plurality of closed-shaped data nodes and the detected connecting lines. The method further includes localizing the free text adjacent to the connecting lines and assembling chunks of the free text oriented and positioned proximally together into text blocks using an orientation-based two-dimensional clustering.

In another embodiment, a system for extracting information from a flowchart image comprising one or more of: a plurality of closed-shaped data nodes having text enclosed within, connecting lines connecting one or more of the plurality of closed-shaped data nodes and free text adjacent to the connecting lines, is disclosed. The system includes a processor and a non-transitory, processor-readable memory coupled to the processor. The non-transitory, processor-readable memory includes a machine readable instruction set stored therein that, when executed by the processor, causes the processor to perform a series of steps starting with receiving the flowchart image as an electronic image file. A plurality of closed-shaped data nodes is detected and the text enclosed within the plurality of closed-shaped data nodes is localized. The localized text within the plurality of closed-shaped data nodes is masked to generate an annotated image. A statistical size distribution of the dimensions of characters in the free text is then generated to identify the connecting lines. Lines in the annotated image are then detected to reconstruct them as closed-shaped data nodes and connecting lines. A tree frame with the plurality of closed-shaped data nodes and the detected connecting lines, is extracted. Then, the free text adjacent to the connecting lines is localized and chunks of the free text oriented and positioned proximally together are assembled into text blocks using an orientation-based two-dimensional clustering.

In yet another embodiment, a computer program product for extracting information from a flowchart image comprising one or more of: a plurality of closed-shaped data nodes having text enclosed within, connecting lines connecting one or more of the plurality of closed-shaped data nodes and free text adjacent to the connecting lines, is disclosed. The computer program product includes programming instructions, which when executed by a computer, cause the computer to carry out a series of steps starting with receiving the flowchart image as an electronic image file. A plurality of closed-shaped data nodes is detected and the text enclosed within the plurality of closed-shaped data nodes is localized. The localized text within the plurality of closed-shaped data nodes is masked to generate an annotated image. A statistical size distribution of the dimensions of characters in the free text is then generated to identify the connecting lines. Lines in the annotated image are then detected to reconstruct them as closed-shaped data nodes and connecting lines. A tree frame with the plurality of closed-shaped data nodes and the detected connecting lines, is extracted. Then, the free text adjacent to the connecting lines is localized and chunks of the free text oriented and positioned proximally together are assembled into text blocks using an orientation-based two-dimensional clustering. Next, characters in the localized text and the text blocks are recognized using a character recognition algorithm. Finally, the tree frame, the localized text and the text blocks are compiled into a flow diagram file having a searchable and interactive electronic file format configured to enable the flow diagram file to have a reduced size than the electronic image file.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
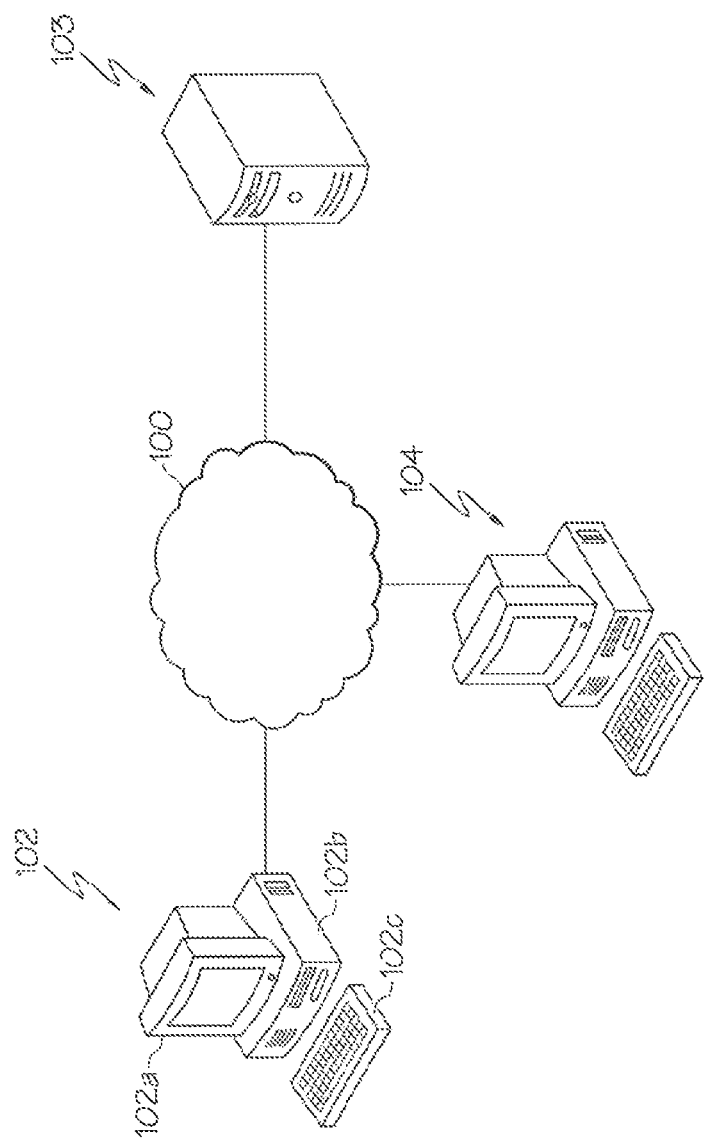
FIG. 1 schematically depicts an example computing network for automatically extracting information from a flowchart image, according to one or more embodiments shown and described herein.

A flowchart image may include document(s) with a visual or graphical representation of data in a sequence representing a logical flow of information. A "document" as used herein, is broadly defined to include a machine-readable and machine-storable work product. A document may include, for example, one or more files, alone or in combination, with a visual representation of information and its flow and these files could be in one or more machine-readable and machine-storable format(s) (such as .png, .jpg, .jpeg, .svg, .eps, .pdf, etc.). A "database" as used herein, is broadly defined to include any machine-readable and machine-storable collection of information. A database may include a graphical database, SQL database or the like.

A "data node" as used herein, is broadly defined as an entity or object in the flowchart image which has text or a block of text enclosed within a geometrical or non-geometrical shape, irrespective of size and other morphological or color variations. A "tree frame" as used herein, is broadly defined to include the non-text component of a flowchart image, consisting of a set of connecting lines (connectors, flow lines), outline of geometrical shapes, outline of non-geometrical shapes etc., irrespective of their size, length and other morphological and color variations. "Free text" as used herein, is broadly defined to include the text characters (or component) of a flowchart image which are adjacent to the set of connecting lines and not enclosed by the geometrical or non-geometrical shapes irrespective of the position, font size, font color, and other font properties.

Embodiments of the disclosure relate to computer-based systems, methods and computer program products for automatically extracting information from a flowchart image. The flowchart image is hypothetically considered to comprise three types of components—(i) a plurality of closed-shaped data nodes representing any geometrical or non-geometrical shape having text enclosed, (ii) a tree frame including lines connecting one or more of the plurality of closed-shaped data nodes as connectors and/or flowlines with arrow heads (cumulatively 'the set of connecting lines') and representing the flowchart structure including the outlines of the geometrical and non-geometrical shapes, and (iii) free text adjacent to the connecting lines and representing evidence to support the connection and/or decision in the information flow. The three types of components are extracted one after another in a sequence in order to eliminate interference during the extraction process. The exact sequence of extraction of the three components, however, may vary in different embodiments depending on the flowchart image and requirements of the extraction process. For example, in a non-limiting example, the free text adjacent to the connecting lines may be extracted before the tree frame or the plurality of closed-shaped data nodes.

The systems, methods and computer program products described herein provide a generalized and adaptive mechanism to automatically extract information from flowchart images that have different shapes, sizes, flow types, formats, colors, content density, quality, fonts, image resolution, etc. Such a mechanism can be applied to any flowchart image to completely and accurately extract the information and determine its flow and order.

Various embodiments for automatically extracting information from a flowchart image are now described below.

Referring now to the drawings, FIG. 1 depicts an exemplary computer network 100, illustrating components for a system that automatically extracts information from a flowchart image, according to one or more embodiments shown and described herein. The computer network 100 may be a wide area network, such as the internet, a local area network (LAN), a mobile communications network, a public service telephone network (PSTN) and/or other network and may be configured to electronically and/or communicatively connect a user computing device 102, a computing device 103 for extracting information from the flowchart image, and an administrator computing device 104.

The user computing device 102 may include a display 102a, a processing unit 102b and an input device 102c, each of which may be communicatively coupled together and/or to the computer network 100. The user computing device 102 may be used to interface with a front-end application using embodiments of the systems and method of extracting information from the flowchart image. In some embodiments, one or more computing devices 103 may be implemented to extract information from the flowchart image by carrying out one or more specific functional steps described herein.

Additionally, included in FIG. 1 is the administrator computing device 104. In the event that the computing device 103 for extracting information from the flowchart image requires oversight, updating, or correction, the administrator computing device 104 may be configured to provide the desired oversight, updating, and/or correction.

It should be understood that while the user computing device 102 and the administrator computing device 104 are depicted as personal computers and the computing device 103 is depicted as a server, these are merely examples. More specifically, in some embodiments, any type of computing device (e.g., mobile computing device, personal computer, server, and the like) may be utilized for any of these components. Additionally, while each of these computing devices is illustrated in FIG. 1 as a single piece of hardware, this is also an example. More specifically, each of the user computing device 102, the computing device 103 the administrator computing device 104 may represent a plurality of computers, servers, databases, and the like. For example, each of the user computing device 102, the computing device 103 and the administrator computing device 104 may form a distributed or grid-computing framework for implementing the specific functional steps described herein.

Figure 2:
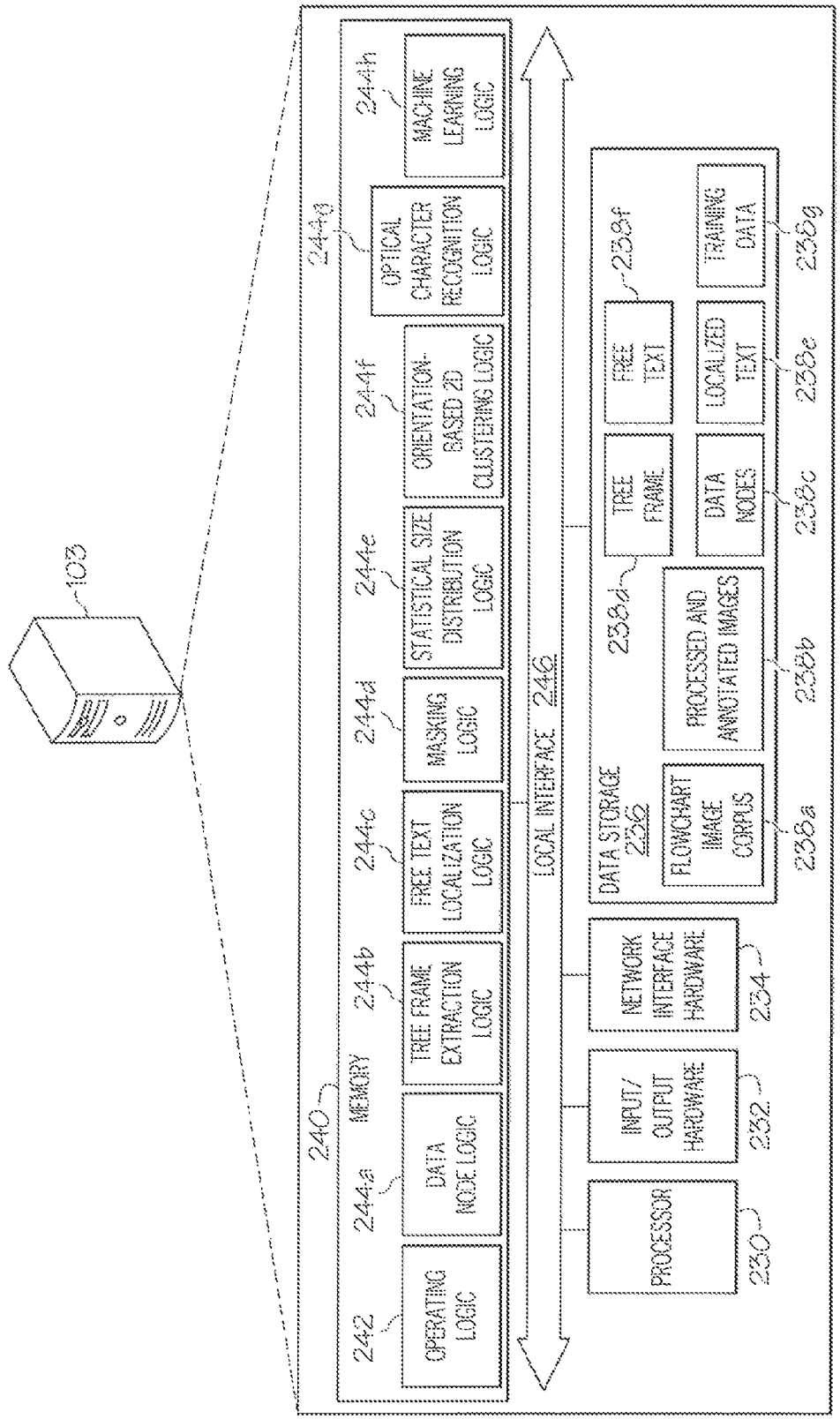
FIG. 2 schematically depicts an example computing device for automatically extracting information from a flowchart image, according to one or more embodiments shown and described herein.

FIG. 2 depicts the internal components of the computing device 103 for extracting information from the flowchart image. The computing device 103 may utilize hardware, software, and/or firmware, according to embodiments shown and described herein. While in some embodiments, the computing device 103 may be configured as a general-purpose computer with the requisite hardware, software, and/or firmware, in some embodiments, the computing device 103 may be configured as a special purpose computer designed specifically for performing the specific functional steps described herein.

As also illustrated in FIG. 2, the computing device 103 may include a processor 230, input/output hardware 232, network interface hardware 234, a data storage component 236, and a memory component 240. The data storage component 236 stores flowchart image corpus 238*a*, processed and annotated images 238*b*, data nodes data 238*c*, tree frame data 238*d*, localized text data 238*e*, free text data 238*f*, and training data 238*g*. The memory component 240 may be machine-readable memory (which may also be referred to as a non-transitory processor-readable memory). The memory component 240 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. The memory component 240 is configured to store operating logic 242, data node logic 244*a*, tree frame extraction logic 244*b*, free text localization logic 244*c*, masking logic 244*d*, statistical size distribution logic 244*e*, orientation-based two-dimensional (2D) clustering logic 244*f*, character recognition logic 244*g* and machine learning logic 244*h* (each of which may be embodied as a computer program, firmware, or hardware, as an example). A local interface 246 is also included in FIG. 2 and may be implemented as a bus or other interface to facilitate communication among the components of the computing device 103.

The processor 230 may include any processing component(s) configured to access and execute a computer program product having programming instructions (such as from the data storage component 236 and/or the memory component 240). The instructions may be in the form of a machine-readable instruction set stored in the data storage component 236 and/or the memory component 240. The instructions may comprise logic or algorithm(s) written in any programming language of any generation (e.g., 1GL, 2GL, 3GL, 4GL, or 5GL) such as, for example, machine language that may be directly executed by the processor 230, or assembly language, object-oriented programming (OOP), scripting languages, microcode, etc., that may be compiled or assembled into machine readable instructions and stored in the memory component 240. Alternatively, the instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

The input/output hardware 232 may include a monitor, keyboard, mouse, printer, camera, microphone, speaker, and/or other device for receiving, sending, and/or presenting data. The network interface hardware 234 may include any wired or wireless networking hardware, such as a modem, LAN port, Wi-Fi card, WiMax card, mobile communications hardware, and/or other hardware for communicating with other networks and/or devices.

It should be understood that the data storage component 236 may reside local to and/or remote from the computing device 103 (for example, in cloud storage) and may be configured to store one or more pieces of data for access by the computing device 103 and/or other components. As illustrated in FIG. 2, the data storage component 236 stores flowchart image corpus 238*a*. Non-limiting examples of the flowchart image corpus 238*a* include flowchart images as present in electronic document data repositories, such as books, book chapters, journal articles, legal documents, publication abstracts, project summaries, proposals, patents, or the like in XML, raw text or other formats. The data storage component 236 may also store processed and annotated images 238*b*. The processed and annotated images 238*b* may include versions of the flowchart images obtained during various stages of the process of extracting information from them. In some embodiments, these versions may be annotated with process information or substantive information obtained while implementing a specific functional step of the methods described herein.

Information on the plurality of closed-shaped data nodes may be stored in data nodes data 238*c*. Information on the tree frame including the set of connecting lines may be stored in tree frame data 238*d*. Information on the localized text in the plurality of data nodes may be stored in localized text data 238*e*. Information on free text adjacent to the connecting lines may be stored in free text data 238*f*. The data storage component 236 may also include training data 238*g*. The training data 238*g* may include one or more datasets developed from flowchart image corpus 238*a* that have been annotated and identified as having accurate or inaccurate annotations. The training data 238*g* may be utilized for training one or more machine learning models for extracting information from the flowchart image.

The memory component 240 includes the operating logic 242, data node logic 244*a*, tree frame extraction logic 244*b*, free text localization logic 244*c*, masking logic 244*d*, statistical size distribution logic 244*e*, orientation-based two-dimensional (2D) clustering logic 244*f*, character recognition logic 244*g* and machine learning logic 244*h*. The operating logic 242 may include an operating system and/or other software for managing components of the computing device 103.

The data node logic 244*a* is configured to detect the plurality of closed-shaped data nodes and localize the text enclosed within the plurality of closed-shaped data nodes, as described below. The data node logic 244a may store a variety of algorithms for this purpose including, but not limited to, canny edge detection algorithm, morphological transformation algorithm, algorithms for method of connected components, contour detection algorithm, statistical filters, Douglas-Peucker algorithm, Hough transformation algorithm, algorithms for Histogram of Orientated Gradients, Scale-Invariant Feature Transform and Hu moment invariants, and a non-maximum compression algorithm.

The tree frame extraction logic 244b is configured to detect lines in the image and extract a tree frame with the plurality of closed-shaped data nodes and the detected connecting lines, as described below. The tree frame extraction logic 244b may store a variety of algorithms for this purpose including, but not limited to, algorithms for Sobel operator, Scharr operator, Laplacian operator, canny edge detection algorithm, probabilistic Hough transformation algorithm, algorithm for morphological gradients to determine kernel-based line approximations, and pixel detection algorithm.

The free text localization logic 244c is configured to localize the free text adjacent to the connecting lines, as described below. The free text localization logic 244c may store a variety of algorithms for this purpose including, but not limited to, morphological transformation algorithm, contour detection algorithm, and a proximity determination algorithm.

The masking logic 244d is configured to mask various components of the flowchart image 300, such as the localized text within the plurality of closed-shaped data nodes and may store customized algorithms configured for such purpose, as described below. The statistical size distribution logic 244e is configured to generate a statistical size distribution of various components of a flowchart image, such as the free text adjacent to the connecting lines and may store customized algorithms configured for such purpose. The orientation-based 2D clustering logic 244f is configured to assemble free text oriented and positioned proximally together into text blocks and may store customized algorithms configured for such purpose.

The character recognition logic 244g is configured to recognize characters in the localized text and text blocks and may store customized algorithms configured for such purpose such as, but not limited to, Optical Character Recognition (OCR), Intelligent Character Recognition (ICR). The machine learning logic 244h is configured to use the training data 238g for training and developing one or more machine learning models for extracting information from the flowchart image may store customized algorithms configured for such purpose.

Figure 3:
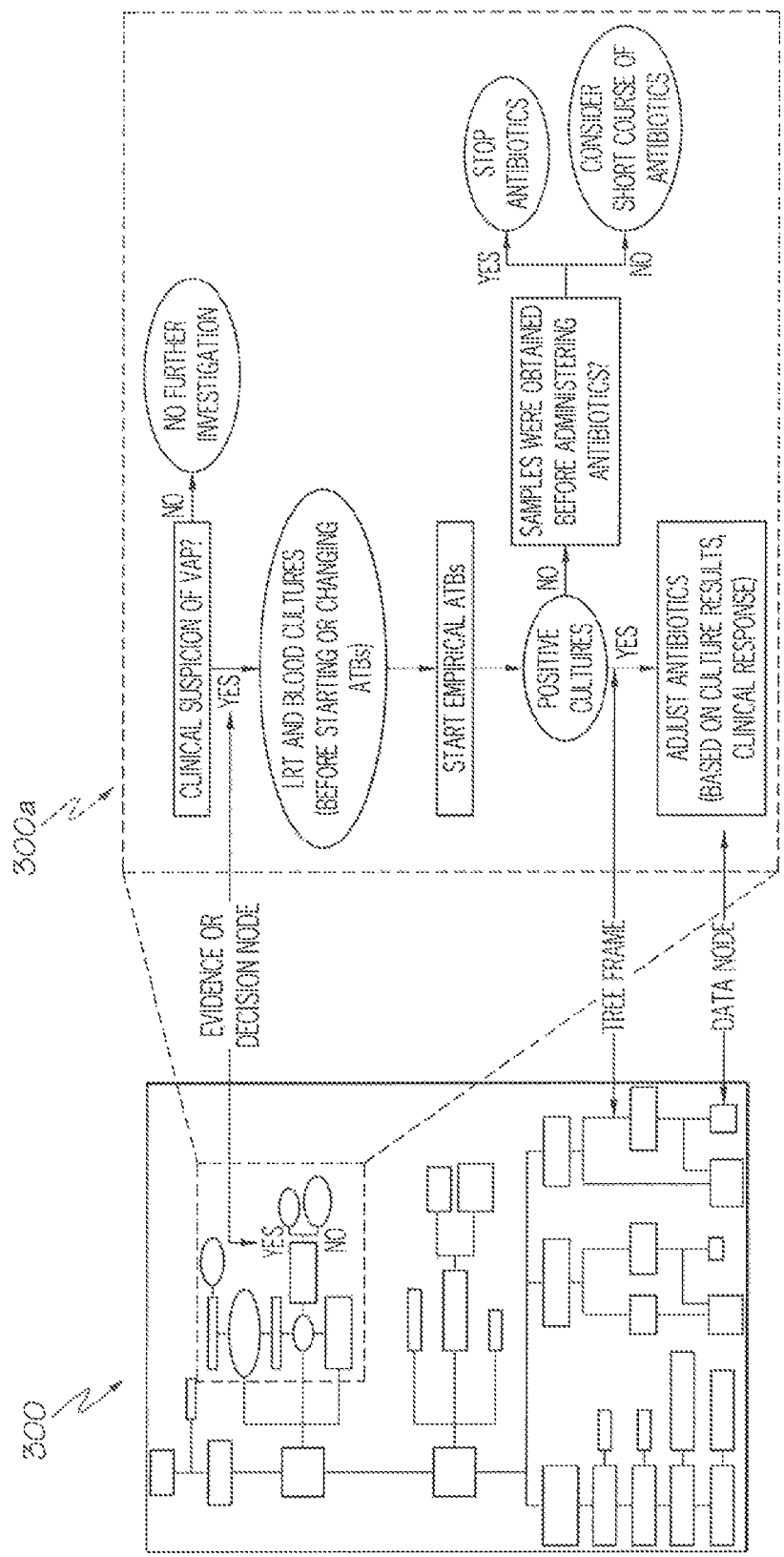
FIG. 3 depicts an example flowchart image received by the example computing device of FIG. 2, according to one or more embodiments shown and described herein.

FIG. 3 depicts an example flowchart image 300 received as an electronic image file by the computing device 103 shown in FIG. 2. A segment 300a of the flowchart image 300 is also shown in expanded view. As discussed above, the flowchart image 300 has three types of components—(i) a plurality of closed-shaped data nodes representing any geometrical or non-geometrical shape having text enclosed, (ii) a tree frame including lines connecting one or more of the plurality of closed-shaped data nodes and representing the flowchart structure including the outlines of the geometrical and non-geometrical shapes, and (iii) free text adjacent to the connecting lines and representing evidence to support the connection and/or decision in the information flow.

Figure 4:
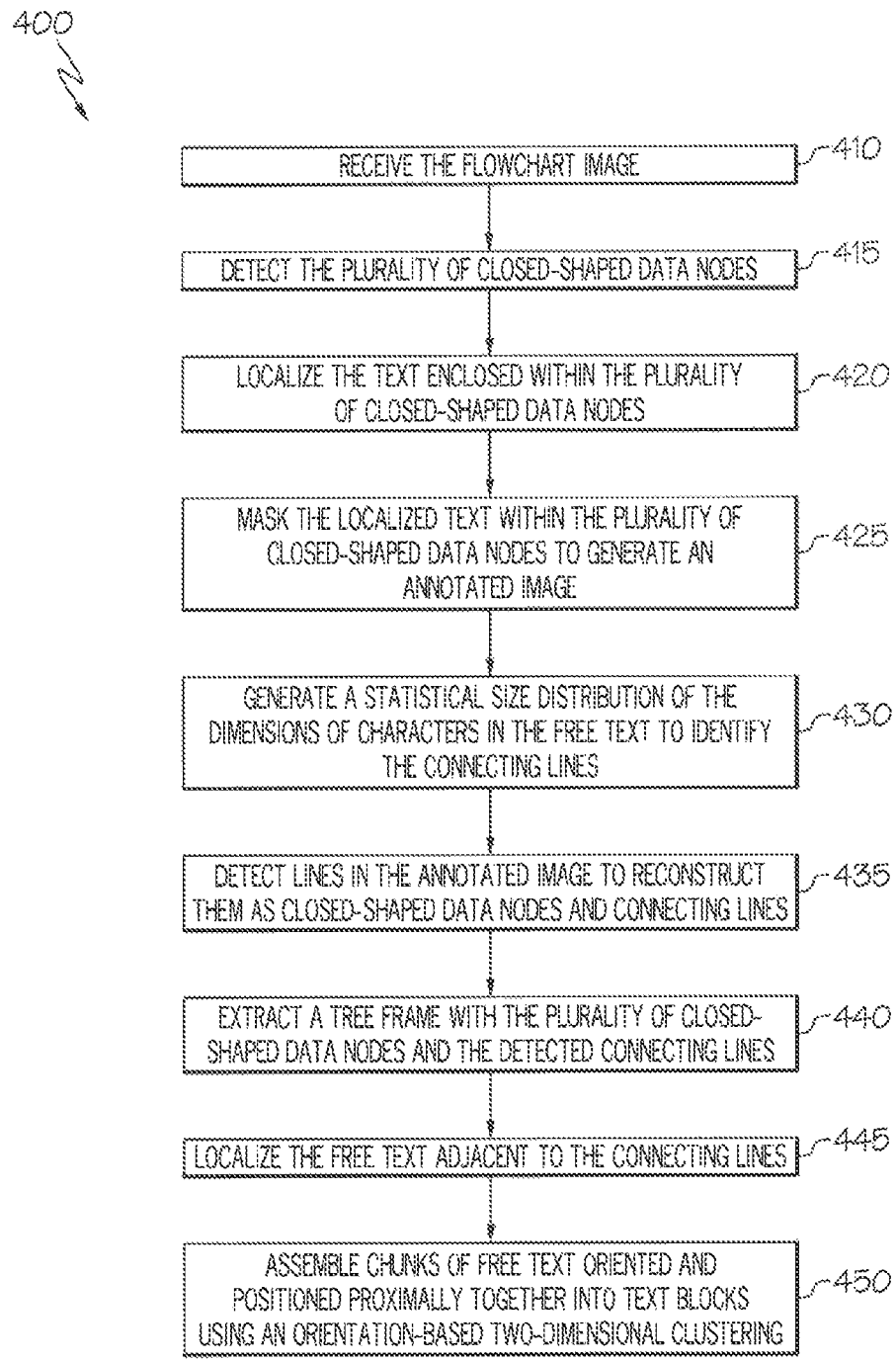
FIG. 4 depicts a block diagram for an example method of extracting information from a flowchart image, according to one or more embodiments shown and described herein.

FIG. 4 depicts a block diagram for an example method 400 of automatically extracting information from the flowchart image 300. In block 410, the flowchart image 300 is received as an electronic image file by the computing device 103. The processor 230 executes a machine-readable instruction set stored in the memory 240 to extract information from the flowchart image 300. The machine-readable instruction set utilizes the data node logic 244a, tree frame extraction logic 244b, free text localization logic 244c, masking logic 244d, statistical size distribution logic 244e, orientation-based two-dimensional (2D) clustering logic 244f, character recognition logic 244g and machine learning logic 244h to perform the specific functional steps of the example method 400.

Figure 5:
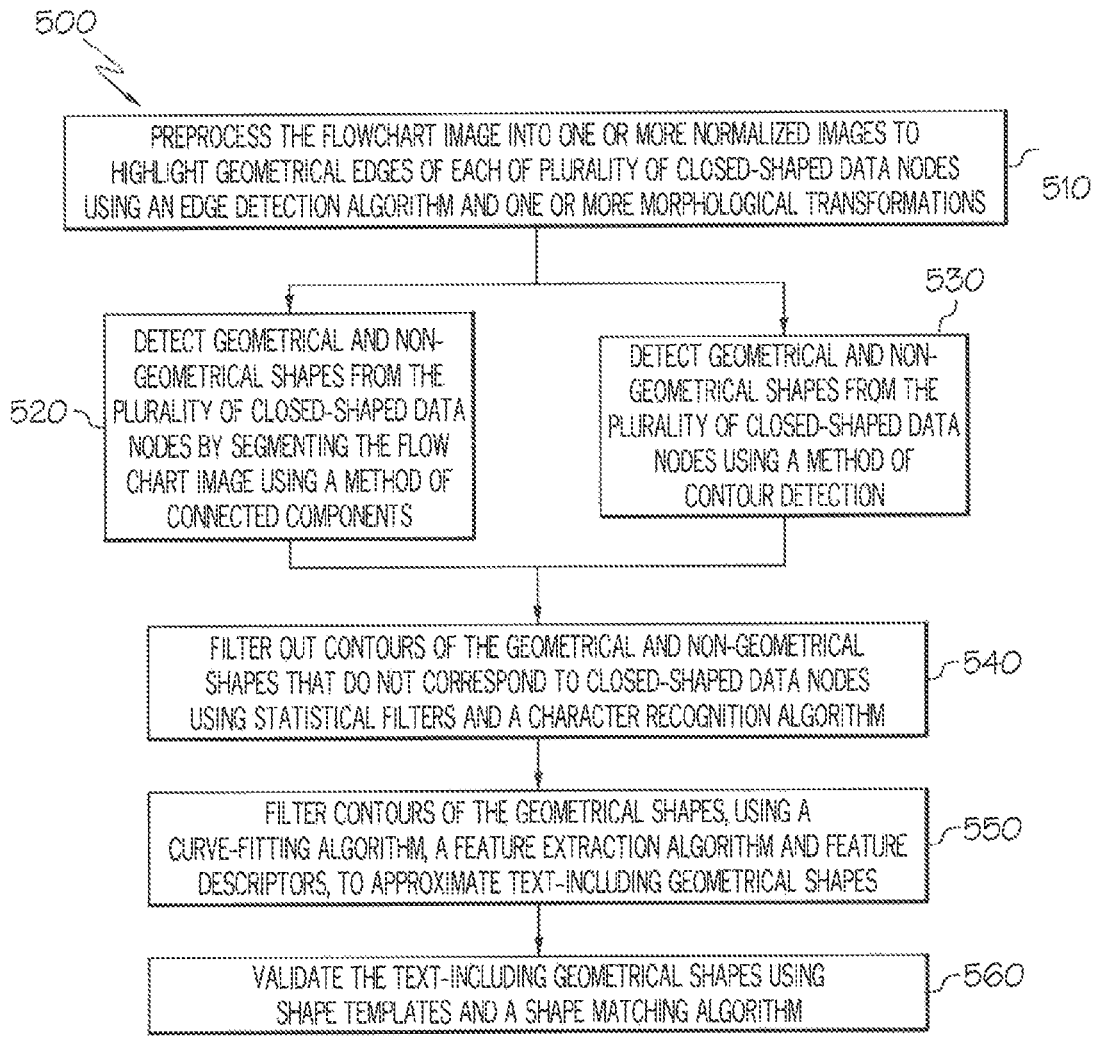
FIG. 5 depicts a block diagram for an example method of detecting a plurality of closed-shaped data nodes as part of the method of FIG. 4, according to one or more embodiments shown and described herein.

In block 415, a plurality of closed-shaped data nodes is detected. FIG. 5 depicts a block diagram of an example method 500 of detecting a plurality of closed-shaped data nodes at block 415. In block 510, the flowchart image 300 is preprocessed into one or more normalized images to highlight geometrical edges of each of the plurality of closed-shaped data nodes. As used herein, the word 'to highlight' means to render a feature more prominent compared to the surrounding features in the foreground of an image. An edge detection algorithm and one or more morphological transformations may be used for this purpose. The normalized images after preprocessing have same or similar properties with respect to shape, size, format, color, content density, quality, and image resolution such that they can be read directly from the flowchart image corpus 238a. The flowchart image 300 is initially converted into a desired image format (.png, .jpg, etc.), resized, denoised and sharpened before preprocessing. In some embodiments, the preprocessing involves one or more of: (i) image binarization (converting the flowchart image into a black-and-white image) using one or more of: simple binarization, adaptive binarization, and Otsu binarization, (ii) inversion of the flowchart image 300 to have a black background and white foreground objects, (iii) morphological transformation through one or more rounds of dilation to expand the white foreground objects using an appropriate structural element or kernel size, (iv) morphological transformation through one or more rounds of erosion to contract the white foreground objects using an appropriate structural element or kernel size, and (v) edge detection using canny edge detection algorithm to highlight the horizontal lines, vertical lines and edges pf the white foreground objects. Further, multiple iterations of preprocessing may be performed on the flowchart image 300 to adaptively highlight the geometrical edges of each of the plurality of closed-shaped data nodes and defocus the text enclosed within the plurality of closed-shaped data nodes. The term "adaptively", as used herein means any approach to choose parameters specific to each flowchart image 300, rather than a global set of parameters applied to a corpus of flowchart images 300. Thus, at the end of block 510, differently preprocessed variations of the flowchart image 300 are obtained.

In block 520, geometrical and non-geometrical shapes are detected from the plurality of closed-shaped data nodes by segmenting the flowchart image using a method of connected components. The differently preprocessed variations of the flowchart image 300 obtained in block 510 are used for this step. The boundaries of the each of the plurality of closed-shaped data nodes are assumed to have a connected set of pixels of similar color and pixel density such that in the binarized versions of differently preprocessed variations of the flowchart image 300, the boundaries can be identified as connected components of the white foreground objects. Each of the differently preprocessed variations of the flowchart image 300 is segmented into unique and overlapping parts to isolate one or more of the plurality of closed-shaped data nodes. Padding in terms of pixels or distance units (inch, cm, mm, etc.) may be added before image segmentation to avoid overlap between foreground pixels and segment edges. The boundaries of each of the plurality of closed-shaped data nodes in each of the differently preprocessed variations of the flowchart image 300 are then detected by labeling pixels based on the values of their neighboring pixels. Thus at the end of block 520, a collection of geometrical and non-geometrical shapes having text enclosed within, are detected at a high level of confidence.

In block 530, which operates parallel to block 520, geometrical and non-geometrical shapes are additionally detected from the plurality of closed-shaped data nodes by using a method of contour detection. The differently preprocessed variations of the flowchart image 300 obtained in block 510 are used for this step. A "contour" as used herein, is broadly defined as all the points or a set of most informative points along the boundary of a curve forming a text character, geometrical or a non-geometrical shape. The plurality of closed-shaped data nodes from among the white foreground objects in the binarized versions of differently preprocessed variations of the flowchart image 300 is localized at first to detect a set of contours in each of the differently preprocessed variations of the flowchart image 300. Then a statistical distribution of the morphological properties (area, perimeter, length, width etc.) of each contour in each of the differently preprocessed variations of the flowchart image 300 is generated. Assuming that text characters outnumber the geometrical and non-geometrical shapes and have smaller values for the morphological properties, an appropriate threshold is used to filter out text characters and detect the collection of geometrical and non-geometrical shapes having text enclosed within. For example, contours of text characters may be filtered out by using $50^{th}$ percentile of the perimeters of the detected contours arranged in descending order, leaving behind a set of contours that are predominant features in the flowchart image 300 and likely represent the collection of geometrical and non-geometrical shapes having text enclosed within. A second round of contour detection may be performed using the segmented image parts of the flowchart image 300 from block 520 to validate the collection of geometrical and non-geometrical shapes having text enclosed within and approximate their location on the flowchart image 300.

The method steps in blocks 520 and 530 are complementary steps performed in parallel to detect geometrical and non-geometrical shapes in order to minimize the unintended effects of image processing. In some embodiments however, only one of the method steps, i.e. either block 520 or block 530 may be used. The method of contour detection used in block 530 may capture a geometrical or non-geometrical shape even when some of the foreground pixels representing the shape outline are missing (or not connected) such that the method of connected components in block 520 cannot detect them accurately. At the same time, the method of contour detection used in block 530 may fail to capture a geometrical or non-geometrical shape if it is confounded by text characters in proximity of the shape, in which case, the shape is captured by the method of connected components in block 520. The unintended effects of image processing may be further reduced by using differently processed variations of flowchart image 300. Approximations for geometrical and non-geometrical shapes using the complementary methods on differently processed variations of flowchart image 300 may be combined to generate a collection of geometrical and non-geometrical shapes that enjoy a higher level of confidence and to define boundaries of the text enclosed within the geometrical and non-geometrical shapes.

In block 540, contours of the geometrical and non-geometrical shapes that do not correspond to closed-shaped data nodes are filtered out from the collection of geometrical and non-geometrical shapes having text enclosed within. In some embodiments, statistical filters related to morphological properties may be used to determine whether a shape is geometrical or non-geometrical in nature. As a non-limiting example, a statistical distribution of contour sizes may be used to filter geometrical and non-geometrical shapes that do not correspond to closed-shaped data nodes. Additionally or alternatively, a character recognition algorithm such as, but not limited to, OCR and/or ICR may be used to confirm the presence of text characters within the geometrical and non-geometrical shapes that are filtered in and determine a collection of text-including geometrical and non-geometrical shapes. The process of filtering out the geometrical and non-geometrical shapes that do not correspond to closed-shaped data nodes significantly reduces the burden of further processing since the flowchart image 300 can have thousands of contours that correspond to alphanumeric characters, geometrical and non-geometrical shapes.

In block 550, contours of the geometrical shapes are detected using a curve-fitting algorithm, a feature extraction algorithm and feature descriptors, to approximate the text-including geometrical shapes. The candidate contours for geometrical shapes are filtered using one or more of: (i) a curve-fitting algorithm such as, but not limited to, Douglas-Peucker algorithm to decimate contours representing a shape into a similar curve with a subset of points defining the original contour, where the Douglas-Peucker algorithm uses a value of epsilon ($\epsilon$, a user-defined threshold distance dimension) computed as a function of the contour's area with or without any defined upper and lower bounds, (ii) a feature extraction algorithm such as, but not limited to, a generalized Hough transformation, in which randomly selected values for length, width, vertices may be used to first generate a collection of geometrical shape templates which are then matched with the candidate contours to identify those that correspond to geometrical shapes, and (iii) feature descriptors such as, but not limited to, Histogram of Orientated Gradients and Scale-Invariant Feature Transform to detect and match local features in the candidate contours. Thus, at the end of block 550, a collection of geometrical shapes having text enclosed within is obtained.

In block 560, the text-including geometrical shapes obtained in block 550 are validated using shape templates and a shape matching algorithm. The text-including geometrical shapes are tested to see whether they enclose alphanumeric characters using character recognition algorithms such as, but not limited to, OCR and/or ICR. The text characters enclosed within the geometrical shapes are extracted and then those geometrical shapes which contain at least a predetermined number N of alphanumeric characters or a predetermined ratio R of alphanumeric characters to all characters are validated as text-including geometrical shapes. The "N" and "R" values may be arbitrarily assigned or adaptively-computed cutoff values. Next, shape templates and a shape-matching algorithm such as, but not limited to, Hu moment invariants are used to determine the exact nature and orientation of the text-including geometrical shapes. Approximations, i.e. position vectors in the coordinate space of the original flowchart image 300, of the text-including geometrical shapes are determined as well. Thus, the plurality of closed-shaped data nodes is reduced to a collection of text-including geometrical shapes after the non-geometrical shapes are filtered out and the approximations of the validated text-including geometrical shapes are determined.

Figure 6:
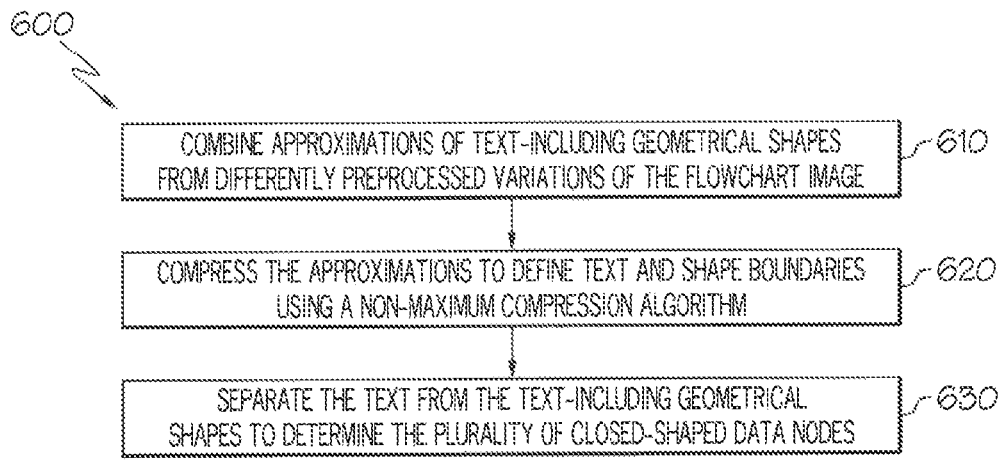
FIG. 6 depicts a block diagram for an example method of localizing text enclosed within the plurality of closed-shaped data nodes as part of the method of FIG. 4, according to one or more embodiments shown and described herein.

Referring back to FIG. 4, in block 420, the text enclosed within the plurality of closed-shaped data nodes is localized. As used herein, "localized" or "localizing" text in an image means to find the text and define its boundaries within the image. FIG. 6 depicts a block diagram of an example method 600 for localizing the text enclosed within the plurality of closed-shaped data nodes at block 420.

In block 610, multiple approximations of text-including geometrical shapes from differently preprocessed variations of the flowchart image 300 and detected through one or both of the method of connected components and the method of contour detection are combined to form the collection of text-including geometrical shapes, which now enjoys a higher level of confidence. These multiple approximations serve as input for further processing in block 620.

In block 620, the approximations of text-including geometrical shapes are compressed to define text and shape boundaries using a non-maximum compression algorithm stored in the data node logic 244a. The multiple approximations of the text-including geometrical shapes are used to separately estimate the approximations of a perimeter for each text-including geometrical shape and a perimeter of an area within which the text is contained.

The non-maximum compression algorithm identifies best fits for a larger bounding box that captures a minimum area matching the text-including geometrical shapes and a distinctly smaller bounding box that captures a minimum area matching the area within which the text is contained. The position vectors from the multiple approximations of each text-including geometrical shape is first used to identify and suppress low-scoring approximations that represent a small portion of or partial text-including geometrical shapes based on statistical distribution of area of the multiple approximations and the degree of overlap with other approximations of the same text-including geometrical shape. Next, a bounding box is determined by selecting Nth percentile of coordinate (x, y) values in a two-dimensional hypothetical search space from the position vectors of the multiple approximations for each of the four bounding coordinates for each of the text-including geometrical shapes and the text within. The Nth percentile is used herein in such way that selecting a set of values for N represents a bounding box (or single best approximation) for the entirety of the text-including geometrical shape that minimizes the area from approximations (or single best approximation) to generate a best fit. Similarly, selecting another set of values for N represents a bounding box with minimum area enclosing the text inside the same geometrical shape.

Thus, the approximations having the minimum area may match the area within which the text is contained and the approximations having the maximum area may match the boundaries of the geometrical shape. The approximations of the text-including geometrical shapes are then used to generate a collection of image masks for the text enclosed within the text-including geometrical shapes. An "image mask" as used herein, is broadly defined to include any operation on an image to hide or mark one or more regions in an image by setting the pixel intensity in the region(s) to zero or to a value matching pixel intensity of the background of the image. A masking algorithm stored in the masking logic 244d may be used for this purpose.

In block 630, the text from the text-including geometrical shapes is separated from each of the text-including geometrical shapes to determine the plurality of closed-shaped data nodes. This is performed using the collection of image masks, which enable the isolation of the text within the text-including geometrical shapes. Thus, the text enclosed within the plurality of closed-shaped data nodes is localized.

Referring back to FIG. 4, in block 425, the localized text within the plurality of closed-shaped data nodes is masked to generate an annotated image. This is performed using the collection of image masks generated in block 620. In some embodiments, the annotated image contains a plurality of closed-shaped data nodes without any text enclosed within each of them and may be stored in processed and annotated image 238b. The annotated image serves as an input for block 435.

In block 430, a statistical size distribution of the dimensions of characters in the free text is generated to identify the connecting lines. The morphological properties (area, perimeter, length, width etc.) of the characters in the free text adjacent to the connecting lines are determined for this purpose using, for example, a statistical size distribution algorithm stored in the statistical size distribution logic 244e. The contours of an area within which the free text is contained are detected using a contour detection step. At the same time, contours of individual alphanumeric characters of the free text are detected by character recognition algorithms such as, but not limited to, OCR and/or ICR. A rectangle (or a circle) of minimum area bounding the individual alphanumeric character is used to compute the height and width (or diameter in case of a circle) of each individual alphanumeric character. Such a process is repeated for all alphanumeric text characters in the free text adjacent to the connecting lines to generate the statistical size distribution. The statistical size distribution is then used to define values of parameters required for detection of the connecting lines in each flowchart image 300. The values of parameters required for line detection of the connecting lines are thus adaptively learnt by excluding edges and structures corresponding to alphanumeric text characters of the free text for each flowchart image 300. This is advantageous due to the variations in fonts of text characters in different flowchart images 300 and accordingly, there is no need to apply global values of parameters for line detection, which may produce inconsistent results for different flowchart images. Subsequently, morphological transformations through one or more rounds of dilation and/or erosion of foreground objects may be used to enhance the accuracy of font height and width approximations of the alphanumeric text characters and prevent merging of multiple alphanumeric text characters in horizontal and vertical directions.

Figure 7:
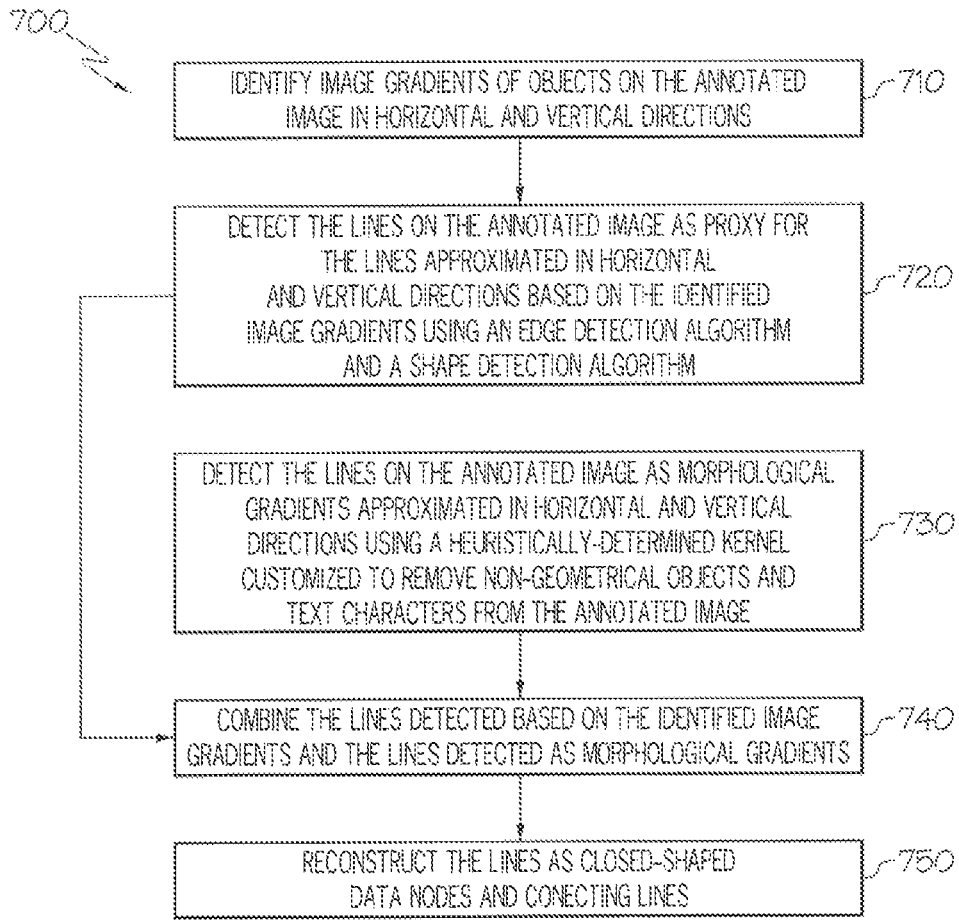
FIG. 7 depicts a block diagram for an example method of detecting lines in the annotated image to reconstruct the lines as closed-shaped data nodes and connecting lines, as part of the method of FIG. 4, according to one or more embodiments shown and described herein.

In block 435, lines in the annotated image are detected to reconstruct the lines as closed-shaped data nodes and connecting lines. FIG. 7 depicts a block diagram of an example method 700 for detecting the lines in the annotated image to reconstruct the lines as closed-shaped data nodes and connecting lines at block 435. While in the embodiment described herein the annotated image contains a plurality of closed-shaped data nodes without any text enclosed within each of them and connecting lines, in other embodiments, the annotated image may contain only connecting lines and accordingly method 700 is adjusted.

In block 710, image gradients of objects on the annotated image in horizontal and vertical directions are identified. In the event, the image gradient has an angular orientation, it may be resolved and approximated into horizontal and vertical components. The image gradients may be approximated by applying image gradient filters such as, but not limited to, Sobel operator, Scharr operator, Laplacian operator, etc. in the horizontal and vertical directions.

In block 720, lines on the annotated image are detected as proxy for the lines approximated in horizontal and vertical directions based on the identified image gradients using an edge detection algorithm and a shape detection algorithm. The intensity of image gradients identified in block 710 are used to detect edges of the lines aligned in horizontal and vertical directions using an edge detection algorithm such as, but not limited to, canny edge detection algorithm. At the same time, the image gradients identified in block 710 are used to approximate the lines using a shape detection algorithm such as, but not limited to, probabilistic Hough transformation.

In block 730, lines on the annotated image are detected as morphological gradients approximated in horizontal and vertical directions using a heuristically-determined kernel customized to remove non-geometrical objects and text characters from the annotated image. This is achieved by selectively removing pixels that correspond to non-geometrical objects and alphanumeric characters from a binarized flowchart image through application of morphological transformations. A heuristic value of the kernel shape and/or size may be adaptively selected from block 430 such that non-geometrical objects and text characters are removed from the annotated image. In some non-limiting examples, the morphological transformations applied include one or more rounds of erosion followed by one or more rounds of dilation in a horizontal direction using a kernel of rectangular shape of size (x, y), where value x and y are assigned based on maximum width and minimum height of each individual alphanumeric character respectively. Accordingly, a binarized image with only horizontal lines is obtained. Similar morphological transformations applied in a vertical direction using a kernel of rectangular shape of size (x, y), where value x and y are assigned based on minimum width and maximum height of each individual alphanumeric character respectively. Accordingly, a binarized image with only vertical lines is obtained. Thus, kernel-based approximations of the lines are detected as morphological gradients in horizontal and vertical directions.

In block 740, the lines detected based on the identified image gradients (from block 720) and the lines detected as morphological gradients (from block 730) are combined to form a set of horizontal and vertical lines for the flowchart image 300, which now enjoys a higher confidence level of detection.

In block 750, the set of horizontal and vertical lines are reconstructed as closed-shaped data nodes and connecting lines, which form different components of the tree frame of the flowchart image 300. The reconstruction process determines the alignment of the horizontal lines and the vertical lines to classify the components. For example, when two horizontal lines and two vertical lines align to form a geometrical shape such as rectangle or a square, they are inferred as forming a closed-shaped data node. The closed-shaped data nodes are then compared and merged with the text-including geometrical shapes obtained in block 560 to ensure that all closed-shaped data nodes are detected. Otherwise, when the horizontal and vertical lines do not align to form a geometrical shape but rather connect other geometrical shapes, they are inferred as a connecting line. Accordingly, the plurality of closed-shaped data nodes and connecting lines forming the tree frame is detected.

Figure 8:
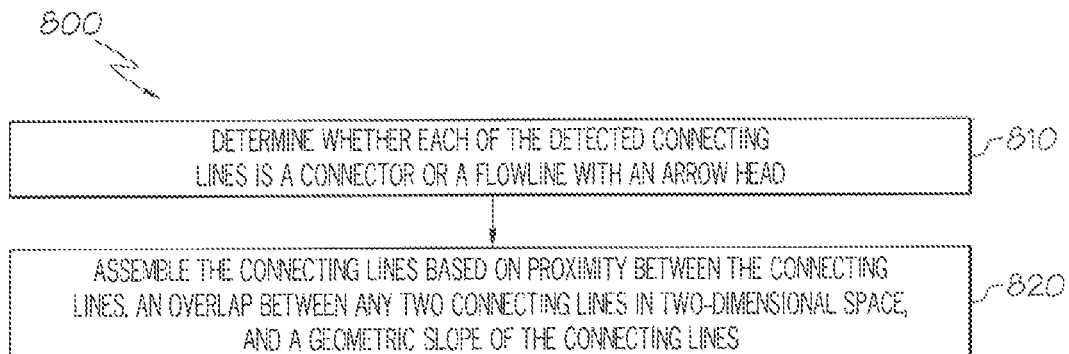
FIG. 8 depicts a block diagram for an example method of extracting a tree frame with the plurality of closed-shaped data nodes and detected connecting lines as part of the method of FIG. 4, according to one or more embodiments shown and described herein.

Referring back to FIG. 4, in block 440, a tree frame with the plurality of closed-shaped data nodes and the detected set of connecting lines is extracted. FIG. 8 depicts a block diagram of an example method 800 for extracting the tree frame with the plurality of closed-shaped data nodes and the detected set of connecting lines at block 440. Detecting the tree frame may be important to determine the hierarchy and flow of information in the flowchart image 300. In block 810, whether each of the detected connecting lines is a connector or a flowline with an arrow head is determined. Foreground pixel densities at two or more ends of the connecting lines are compared to determine the presence or absence of an arrow head. An elliptical structuring element (or kernel) may be defined to compute and compare pixel densities. High pixel density indicates presence of an arrow head, which classifies a connecting line as a flowline. On the other hand, low pixel density indicates absence of an arrow head, which classifies a connecting line as a connector joining two or more closed-shaped data nodes.

Figure 9A:
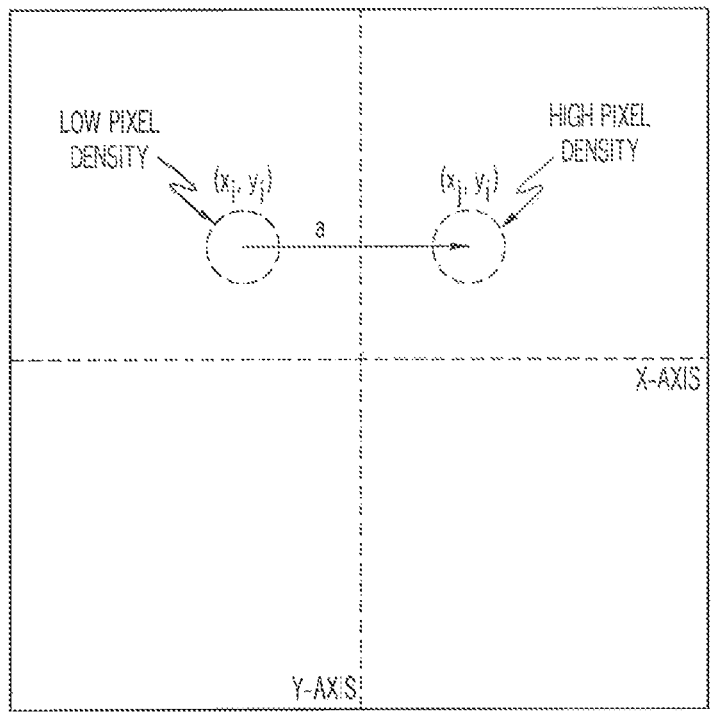
FIGS. 9A-9C depict illustrative examples of assembling the detected connecting lines based on proximity between the connecting lines, an overlap between any two connecting lines in two-dimensional space, and a geometric slope of the connecting lines as part of the method of FIG. 8, according to one or more embodiments shown and described herein.
Figure 9B:
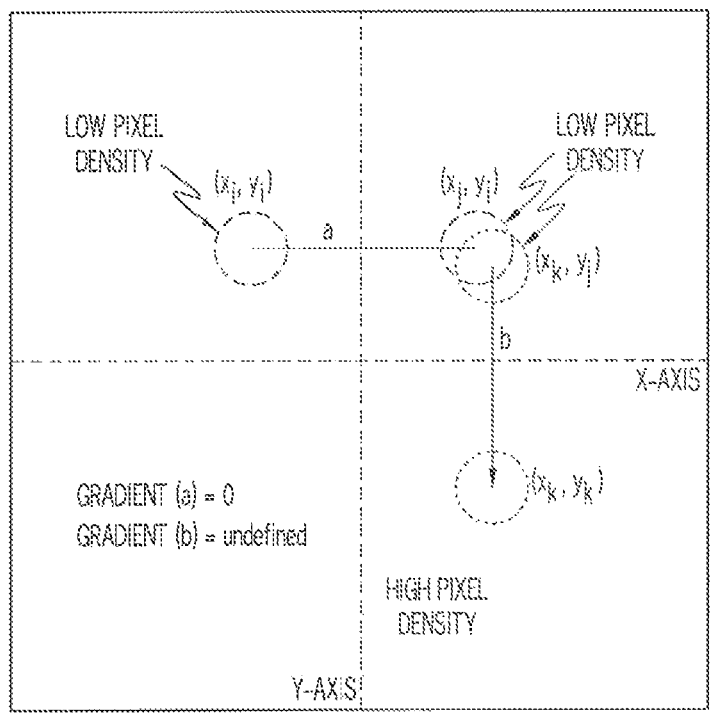
Figure 9C:
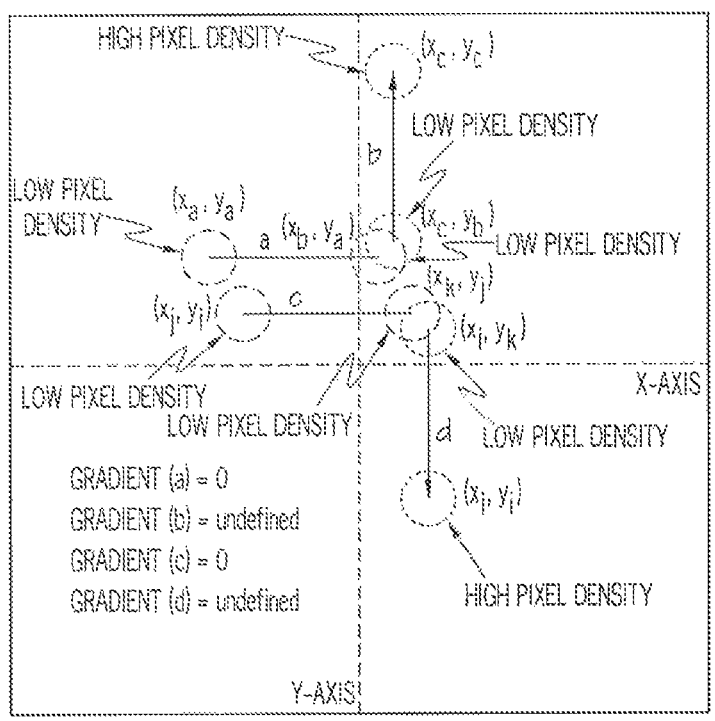

In block 820, the connecting lines are assembled based on proximity between the ends of connecting lines, an overlap between any two connecting lines in two-dimensional space, and a geometric slope of the connecting lines. FIGS. 9A-9C depict illustrative examples of such assembly of connecting lines. As shown in FIG. 9A, a connecting line 'a' is isolated and a hypothetical search space around it is searched for ends of other connecting lines. If no other connecting lines are found in proximity to the connecting line 'a', the foreground pixel densities at both ends of the connecting line 'a' are compared to determine whether it is a connector or a flowline with an arrow head, as indicated by high pixel density.

On the other hand, if another connecting line 'b' is found in proximity to the connecting line 'a', then an coordinate overlap in the hypothetical two-dimensional search space between the two connecting lines 'a' and 'b' as well as a slope of each of the connecting lines 'a' and 'b' are determined. If there is sufficient coordinate overlap between the connecting lines 'a' and 'b', then they are rejected as candidates for an elbow-shaped connector/flowline; otherwise not. Then, if the geometric slope of each of the connecting lines 'a' and 'b' align, they are rejected as candidates for an elbow-shaped connector/flowline, as well. Thus, the connecting lines 'a' and 'b' become candidates for an elbow-shaped connector/flowline only if the connecting lines 'a' and 'b' have minimal to no coordinate overlap in the hypothetical search space and their geometric slopes have different orientation. Then the foreground pixel densities of the four ends of the connecting lines 'a' and 'b' are compared to determine the presence of an arrow head, indicated by high pixel density. If either of the two proximal ends of the candidate elbow-shaped connector/flowline formed by the connecting lines 'a' and 'b' have high pixel density compared to the distal end, then they are rejected as a candidate elbow-shaped connector/flowline. If either of the two distal ends of the candidate elbow-shaped connector/flowline have high pixel density, then they indeed form an elbow-shaped flowline. If neither of the two distal ends of the candidate elbow-shaped connector/flowline have high pixel density, then they form an elbow-shaped connector, in which case the distal ends, also termed 'leading ends of the elbow-shaped connector', are further subject to the same testing as above to determine presence of other connecting lines and until an arrow head is detected at the distal end of such other connecting line.

In the illustrative example shown in FIG. 9B, connecting lines 'a' and 'b' have no coordinate overlap in the hypothetical search space and their geometric slopes have different orientation. Further, the fact that both ends of the connecting line 'a' have low pixel density indicates that it is a connector. On the other hand, the proximal end of the connecting line 'b' nearer to connecting line 'a' has low pixel density, while the distal end of the connecting line 'b' farther from connecting line 'a' has high pixel density indicating presence of an arrow head. This indicates that the distal end of the connecting line 'b' forms the arrowhead of an elbow-shaped flowline formed by the connecting lines 'a' and 'b'.

In the illustrative example shown in FIG. 9C, connecting lines 'a', 'b', 'c', 'd' form a cluster based on proximity. However, connecting lines 'a' and 'c' have the same geometric slope and connecting lines 'b' and 'd' have the same geometric slope. Accordingly, the candidates for elbow-shaped connector/flowline are those formed by the connecting lines 'a' and 'b', formed by the connecting lines 'a' and 'd', formed by the connecting lines 'c' and 'b' and formed by the connecting lines 'c' and 'd'. Further, the fact that both ends of the connecting lines 'a' and 'c' have low pixel density indicates that both are connectors. On the other hand, the distal ends of the connecting lines 'b' and 'd' have high pixel densities indicating presence of arrow heads. Since the connecting line 'b' is determined to be more proximal to connecting line 'a' than connecting line 'c', an elbow-shaped flowline formed by the connecting lines 'a' and 'b' can be inferred. Similarly, since the connecting line 'd' is determined to be more proximal to connecting line 'c' than connecting line an elbow-shaped flowline formed by the connecting lines 'c' and 'd' can be inferred.

Using the methods outlined above, a tree frame with the plurality of closed-shaped data nodes and connecting lines is extracted. Since the tree frame does not include other components such as text characters, words or other irrelevant shapes, a second round of shape detection may be used by applying machine learning and/or deep learning algorithms trained on a set of geometrical shapes generated using arbitrary values of height, width, rotation, diameter, etc. This enables the validation of the detected approximations of the plurality of closed-shaped data nodes as well as identification of any geometrical shapes not detected during block 415. The machine learning algorithms may be stored in training data 238g and used by the machine learning logic 244h.

Figure 10:
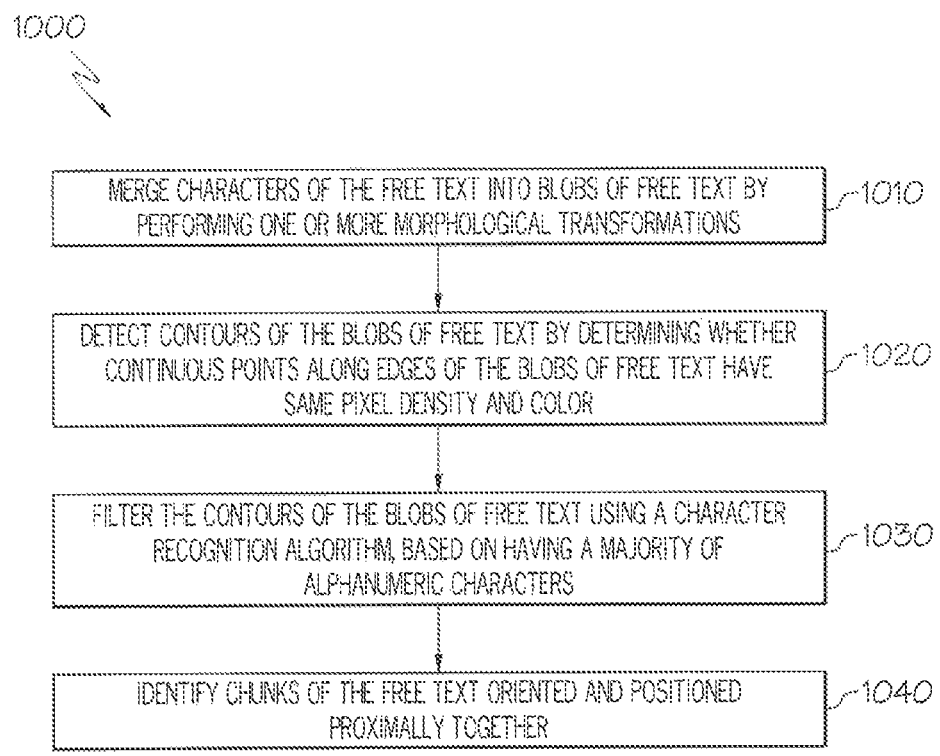
FIG. 10 depicts a block diagram for an example method of localizing the free text adjacent to the connecting lines as part of the method of FIG. 4, according to one or more embodiments shown and described herein.

Referring back to FIG. 4, in block 445, the free text adjacent to the connecting lines is localized. FIG. 10 depicts a block diagram of an example method 1000 for localizing the free text adjacent to the connecting lines at block 445. The free text adjacent to the connecting lines represents evidence to support the connection and/or decision in the information flow in the flowchart image 300. An annotated image with masks applied to the plurality of closed-shaped data nodes detected in block 415/560 and the tree frame detected in block 440/820, is generated. This annotated image is used as an input for block 1010.

In block 1010, characters of the free text are merged into blobs of free text by performing one or more morphological transformations. As used herein, the word 'blob' means a collection of characters (for e.g. alphanumeric characters) that are positioned adjacent to each other but not necessarily assigned to a word or phrase. The morphological transformations applied on the annotated image from block 1010 include one or more rounds of dilation to expand the foreground features in order to merge the individual alphanumeric characters into blobs of free text representing single or multi-line text strings representing sensible information.

In block 1020, contours of the blobs of free text are detected by determining whether continuous points along edges of the blobs of free text have same pixel density and color. The contours of the blobs of free text are then used to segment the morphologically transformed annotated image into individual object-specific fragments, which are used as input for the next step in block 1030.

In block 1030, the contours of the blobs of free text are filtered using a character recognition algorithm, based on having a majority of alphanumeric characters. In some embodiments, a character recognition algorithm such as, but not limited to OCR and/or ICR may be used. In other embodiments, more than one of these character recognition algorithms may be used. The individual object-specific fragments of the image obtained in block 1020 are used for this process. Image fragments with the majority of individual elements matching alphanumeric characters are retained and the other elements are filtered out as remnants of the data nodes or the tree frame.

In block 1040, chunks of free text oriented and positioned proximally together are identified. As used herein, the word 'chunk' means a collection of blobs assembled together with potential to render logical meaning to the free text. As a non-limiting example, a 'neighborhood test' is implemented for this purpose. The image fragments with the majority of alphanumeric characters from block 1030 are used to determine approximations of chunks of free text adjacent to the connecting lines in the flowchart image 300. The image fragments include many candidate chunks of free text. By repeatedly testing the proximity between any two candidate chunks of free text from the image fragments having a majority of alphanumeric characters, the chunks of free text oriented and positioned proximally together are identified. Proximity between any two chunks of free text is determined with respect to proximity of a reference position vector of a text chunk, which is defined as the leftmost-topmost position vector representing an individual text chunk. A chunk of free text is deemed to be proximal to a query text chunk if its reference position vector falls within a predefined two-dimensional hypothetical search space around the query text chunk. The predefined two-dimensional hypothetical search space around the query text chunk extends in both horizontal and vertical directions and may be defined as a function of length and/or width of the query text chunk.

Referring back to FIG. 4, in block 450, the chunks of free text oriented and positioned proximally together are then assembled into text blocks using an orientation-based two-dimensional clustering. In other words, the chunks of free text satisfying the 'neighborhood test' implemented in block 1040 are subjected to a 'membership test' through the orientation-based two-dimensional clustering process.

Figure 11:
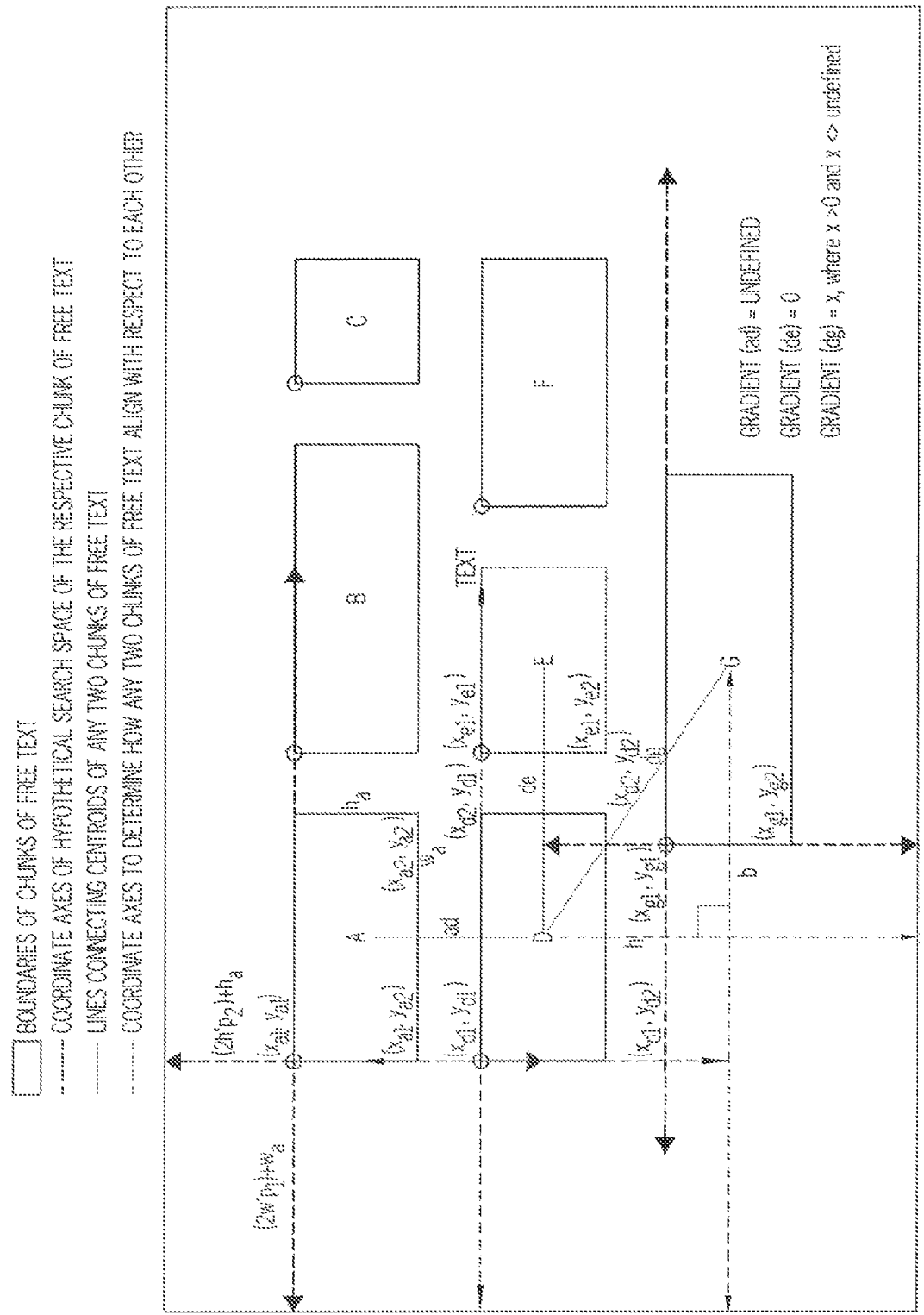
FIG. 11 depicts an illustrative example of assembling the free text oriented and positioned proximally together into text blocks using an orientation-based two-dimensional clustering as part of the method of FIG. 4, according to one or more embodiments shown and described herein.

FIG. 11 depicts an illustrative example of assembling the free text oriented and positioned proximally together into an assembly of text blocks using the orientation-based two-dimensional clustering. As used herein, the word 'assembly' means a set of neighboring text blocks that satisfy the 'membership test' and represent a single cluster of free text. Starting with a first chunk of free text as the first member of the assembly, any neighboring chunk of free text in the hypothetical search space around the first chunk of free text is tested using the 'membership test' to determine membership in the assembly. In some embodiments, the 'membership test' may incorporate a threshold for testing an approximate test distance in the hypothetical search space between a member of the assembly and a neighboring chunk of free text, such that the neighboring chunk of free text is deemed to be a member of the assembly if the test distance is less than the threshold.

In some embodiments, the test distance for the 'membership test' may be computed as the Euclidean distance between the closest edges of the assembly member and the neighboring chunk of free text. The choice of edges may depend on the orientation of the neighboring chunk of free text with respect to the assembly member in the hypothetical search space. As shown in the non-limiting example of FIG. 11, if the chunk of free text, D is the assembly member and the chunk of free text, E is the neighboring chunk of free text, the test distance may be the distance between the vertical edges represented by the position vectors $<(x_{d2},y_1), (x_{d2},y_{d2})>$ and $<(x_{e1},y_{e1}), (x_{e1},y_{e2})>$ respectively since the neighboring chunk of free text E is horizontally aligned with the assembly member D. On the other hand, if the chunk of free text, D is the assembly member and the chunk of free text, A is the neighboring chunk of free text, the test distance may be the distance between the horizontal edges represented by the position vectors $<(x_{a1},y_{a2}), (x_{a2},y_{a2})>$ and $<(x_{d1},y_{d1}), (x_{d2},y_{d1})>$ respectively since the neighboring chunk of free text A is vertically aligned with the assembly member D.

In some embodiments, given the variable size and the number of the chunks of the free text, the threshold may be computed as a function of height or width of the neighboring chunk of free text and/or the assembly member, where the choice of the height or width as test threshold depends upon orientation of the neighboring chunk of free text with respect to the assembly member in the hypothetical search space. In a non-limiting example, in case the chunks of free text represent a word, the expected distance between the closest horizontally aligned neighboring chunk of free text and an assembly member may be the minimum width of the neighboring chunk of free text and the assembly member. In another non-limiting example, in case the chunks of free text represent a word, the expected distance between the closest vertically aligned neighboring chunk of free text and an assembly member may be the minimum height of the neighboring chunk of free text and the assembly member. In yet another non-limiting example, in case the chunks of free text represent a text character, the expected distance between the closest horizontally aligned neighboring chunk of free text and an assembly member (which may be a text character or a word) may be defined as the lesser of the width of the neighboring chunk of free text and the assembly member multiplied by a constant $\rho$, where $\rho$ is a positive real number. Since, $\rho$ serves as a distance multiplier its value may be chosen between one and two.

The orientation of the neighboring chunk of free text with respect to the assembly member in the hypothetical search space is inferred from the geometric slope of the line connecting their centroids. If the geometric slope is close to zero (for example, chunks D and E in FIG. 11), then the neighboring chunk of free text is assumed to be horizontally aligned with the assembly member and is positioned on a side of the assembly member. If the geometric slope is undefined (for example, chunks D and A in FIG. 11), then the neighboring chunk of free text is assumed to be vertically aligned with the assembly member and is positioned above or below the assembly member. If the geometric slope of the line connecting their centroids has a finite value greater than zero (for example, chunks D and G in FIG. 11), then their alignment is decided based on either the geometric slope or the distance between them in horizontal and vertical directions computed by treating the line connecting their centroids ('dg' in FIG. 11) as a hypotenuse for a hypothetical right triangle with the legs (shown as 'b' and 'h' in FIG. 11). The legs may be inferred by extending lines from both centroids and finding vertices where these intersect each other. In some embodiments, the longer of the two legs may be used to determine orientation of the neighboring chunk of free text with respect to the assembly member in the hypothetical search space. In the illustrative example of FIG. 11, the leg 'b' is longer than the leg 'h' and hence the neighboring chunk of free text G, though diagonally oriented with the assembly member D, may be treated as horizontally aligned with assembly member D. Accordingly, the threshold for the 'membership test' may be a function of the minimum width of the neighboring chunk of free text G and the assembly member D and the test distance may be the distance between edges represented by the position vectors $<(x_{d2},y_{d1}), (x_{d2},y_{d2})>$ and $<(x_{g1},y_{g1}), (x_{g1},y_{g2})>$.

Neighboring chunks of free text are tested with respect to the assembly member using the above methods and those that pass the 'membership test' are added to the assembly as new members. A new iteration of the 'membership test' is then initiated in which neighboring chunks of free text of the newly-added members of the assembly are tested to determine membership in the assembly. This process is repeated until no new member can be added to the assembly. The chunks of free text added to a particular assembly are separated from unassigned chunks of free text. One of the unassigned chunks of free text is then selected, randomly or based on its position, to start the process of finding its neighboring chunks through 'neighborhood test' of free text and to determine memberships in an assembly having the unassigned chunk of free text.

After all the information is extracted at the end of block 450, characters in the localized text and the text blocks are recognized using a character recognition algorithm such as, but not limited to, OCR and/or ICR. In some embodiments, more than one of these character recognition algorithms may be used. Thus, the three types of components of the flowchart image 300—localized text enclosed within a plurality of closed-shaped data nodes, a tree frame including the plurality of closed-shaped data nodes and the connecting lines connecting one or more of the plurality of closed-shaped data nodes, and free text adjacent to the connecting lines—are extracted one after another. The three types of components are then compiled into a flow diagram file. The flow diagram file has a searchable and interactive/or electronic file format such as, but not limited to, JSON, DOT, GraphSON. The electronic file format enables the flow diagram file to have a reduced size than the original electronic image file of the flowchart. Size compression of the original electronic image file allows the flow diagram file to be stored with less storage space and transferred over reduced times.

The JSON is an open-standard file format that enables the flow diagram file to be presented as a general-purpose catalog of the extracted components for subsequent search and interaction. The DOT is a graph description language format that enables the flow diagram file to be presented in a universally accepted graphical form. The GraphSON is a JSON-based graphical format that enables the flow diagram file to be directly integrated into well-known graphical tools, programming libraries and knowledge bases. Various other searchable and interactive electronic file formats may be used instead of JSON, DOT, and GraphSON which are used as non-limiting examples. In some embodiments, the flow diagram file may be interconvertible among these searchable and interactive electronic file formats.

Flowchart images contain static information and complex structures having different shapes, sizes, flow types, formats, colors, content density, quality, fonts, image resolution, etc. The ability to easily transfer the stored information and interact with the resultant flow diagram file after extraction is thus as valuable as the complete and accurate extraction of information from the flowchart images for subsequent beneficial use. The systems, methods and computer program products shown and described herein solve both technical issues. As described in detail above, improvements in computer-based implementation of the extracted information are achieved through size compression, easy transferability and interactive nature of the resultant flow diagram file. Further, the specific configuration of computer-based systems, methods and computer program products enable a more efficient and accurate manner of extracting the information from the flowchart images relative to conventional computer systems, while preserving the original structure of the flowchart.

The systems, methods and computer program products for automatically extracting information from a flowchart image using computer vision techniques described herein can thus transform flowchart images into searchable and interactive assets that can be easily learned by machines and humans alike. The information retrieved from the flowchart images can also be easily stored as algorithms in knowledge bases. Accordingly, the systems, methods and computer program products described herein can be advantageously applied in advanced computer-aided decision-making in a variety of fields as well as automated generation of question/answering to educate personnel in those fields. Due to the compressed size and easily accessible format, the information retrieved can be conveniently used for publishing (for example to re-render image to a required size and/or resolution), quick online transfer, processing text via natural language processing and/or for data science applications.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of extracting information from a flowchart image comprising one or more of: a plurality of closed-shaped data nodes having text enclosed within, connecting lines connecting one or more of the plurality of closed-shaped data nodes and free text adjacent to the connecting lines, the method comprising the following steps:
   receiving the flowchart image as an electronic image file;
   detecting the plurality of closed-shaped data nodes;
   localizing the text enclosed within the plurality of closed-shaped data nodes;
   masking the localized text within the plurality of closed-shaped data nodes to generate an annotated image;
   generating a statistical size distribution of the dimensions of characters in the free text to identify the connecting lines;
   detecting lines in the annotated image to reconstruct the lines as closed-shaped data nodes and connecting lines;
   extracting a tree frame with the plurality of closed-shaped data nodes and the detected connecting lines;
   localizing the free text adjacent to the connecting lines; and
   assembling chunks of the free text oriented and positioned proximally together into text blocks using an orientation-based two-dimensional clustering.

2. The method of claim 1 further comprising the following steps:
   recognizing characters in the localized text and the text blocks using a character recognition algorithm; and
   compiling the tree frame, the localized text and the text blocks into a flow diagram file having a searchable and interactive electronic file format configured to enable the flow diagram file to have a reduced size than the electronic image file.

3. The method of claim 1, wherein the step of detecting lines in the annotated image to reconstruct the lines as closed-shaped data nodes and connecting lines comprises the following steps:
   identifying image gradients of objects on the annotated image in horizontal and vertical directions;
   detecting the lines on the annotated image as proxy for the lines approximated in horizontal and vertical directions based on the identified image gradients using an edge detection algorithm and a shape detection algorithm;
   detecting the lines on the annotated image as morphological gradients approximated in horizontal and vertical directions using a heuristically-determined kernel customized to remove non-geometrical objects and text characters from the annotated image;
   combining the lines detected based on the identified image gradients and the lines detected as morphological gradients; and
   reconstructing the lines as closed-shaped data nodes and connecting lines.

4. The method of claim 1, wherein the step of extracting a tree frame with the plurality of closed-shaped data nodes and the detected connecting lines comprises the following steps:
   determining whether each of the detected connecting lines is a connector or a flowline with an arrow head; and
   assembling the connecting lines based on proximity between the connecting lines, an overlap between any two connecting lines in two-dimensional space, and a geometric slope of the connecting lines.

5. The method of claim 1, wherein the step of localizing the free text adjacent to the connecting lines comprises the following steps:
   merging characters of the free text into blobs of free text by performing one or more morphological transformations;

detecting contours of the blobs of free text by determining whether continuous points along edges of the blobs of free text have same pixel density and color;

filtering the contours of the blobs of free text using a character recognition algorithm, based on having a majority of alphanumeric characters; and identifying chunks of the free text oriented and positioned proximally together.

6. The method of claim 1, wherein the step of detecting the plurality of closed-shaped data nodes comprises the following steps:

preprocessing the flowchart image into one or more normalized images to highlight geometrical edges of each of the plurality of closed-shaped data nodes using an edge detection algorithm and one or more morphological transformations;

detecting geometrical and non-geometrical shapes from the plurality of closed-shaped data nodes by segmenting the flowchart image using a method of connected components;

detecting geometrical and non-geometrical shapes from the plurality of closed-shaped data nodes by using a method of contour detection;

filtering out contours of the geometrical and non-geometrical shapes that do not correspond to closed-shaped data nodes using statistical filters and a character recognition algorithm;

filtering contours of the geometrical shapes, using a curve-fitting algorithm, a feature extraction algorithm and feature descriptors, to approximate text-including geometrical shapes; and validating the text-including geometrical shapes using shape templates and a shape matching algorithm.

7. The method of claim 1, wherein the step of localizing the text enclosed within the plurality of closed-shaped data nodes comprises the following steps:

combining approximations of text-including geometrical shapes from differently preprocessed variations of the flowchart image;

compressing the approximations to define text and shape boundaries using a non-maximum compression algorithm; and separating the text from the text-including geometrical shapes to determine the plurality of closed-shaped data nodes.

8. A system for extracting information from a flowchart image comprising one or more of: a plurality of closed-shaped data nodes having text enclosed within, connecting lines connecting one or more of the plurality of closed-shaped data nodes and free text adjacent to the connecting lines, the system comprising:

a processor; and a non-transitory, processor-readable memory coupled to the processor, the non-transitory, processor-readable memory comprising a machine readable instruction set stored therein that, when executed by the processor, causes the processor to perform the following steps:

receive the flowchart image as an electronic image file;

detect the plurality of closed-shaped data nodes;

localize the text enclosed within the plurality of closed-shaped data nodes;

mask the localized text within the plurality of closed-shaped data nodes to generate an annotated image;

generate a statistical size distribution of the dimensions of characters in the free text to identify the connecting lines;

detect lines in the annotated image to reconstruct the lines as closed-shaped data nodes and connecting lines;

extract a tree frame with the plurality of closed-shaped data nodes and the detected connecting lines;

localize the free text adjacent to the connecting lines; and assemble chunks of the free text oriented and positioned proximally together into text blocks using an orientation-based two-dimensional clustering.

9. The system of claim 8, wherein the machine readable instruction set further causes the processor to perform the following steps:

recognize characters in the localized text and the text blocks using a character recognition algorithm; and compile the tree frame, the localized text and the text blocks into a flow diagram file having a searchable and interactive electronic file format configured to enable the flow diagram file to have a reduced size than the electronic image file.

10. The system of claim 8, wherein the machine readable instruction set to detect lines in the annotated image to reconstruct the lines as closed-shaped data nodes and connecting lines further causes the processor to perform the following steps:

identify image gradients of objects on the annotated image in horizontal and vertical directions;

detect the lines on the annotated image as proxy for the lines approximated in horizontal and vertical directions based on the identified image gradients using an edge detection algorithm and a shape detection algorithm;

detect the lines on the annotated image as morphological gradients approximated in horizontal and vertical directions using a heuristically-determined kernel customized to remove non-geometrical objects and text characters from the annotated image;

combine the lines detected based on the identified image gradients and the lines detected as morphological gradients; and reconstruct the lines as closed-shaped data nodes and connecting lines.

11. The system of claim 8, wherein the machine readable instruction set to extract a tree frame with the plurality of closed-shaped data nodes and the detected connecting lines further causes the processor to perform the following steps:

determine whether each of the detected connecting lines is a connector or a flowline with an arrow head; and assemble the connecting lines based on proximity between the connecting lines, an overlap between any two connecting lines in two-dimensional space, and a geometric slope of the connecting lines.

12. The system of claim 8, wherein the machine readable instruction set to localize the free text adjacent to the connecting lines further causes the processor to perform the following steps:

merge characters of the free text into blobs of free text by performing one or more morphological transformations;

detect contours of the blobs of free text by determining whether continuous points along edges of the blobs of free text have same pixel density and color;

filter the contours of the blobs of free text using a character recognition algorithm, based on having a majority of alphanumeric characters; and identify chunks of the free text oriented and positioned proximally together.

13. The system of claim 8, wherein the machine readable instruction set to detect the plurality of closed-shaped data nodes further causes the processor to perform the following steps:
- preprocess the flowchart image into one or more normalized images to highlight geometrical edges of each of the plurality of closed-shaped data nodes using an edge detection algorithm and one or more morphological transformations;
- detect geometrical and non-geometrical shapes from the plurality of closed-shaped data nodes by segmenting the flowchart image using a method of connected components;
- detect geometrical and non-geometrical shapes from the plurality of closed-shaped data nodes by using a method of contour detection;
- filter out contours of the geometrical and non-geometrical shapes that do not correspond to closed-shaped data nodes using statistical filters and a character recognition algorithm;
- filter contours of the geometrical shapes, using a curve-fitting algorithm, a feature extraction algorithm and feature descriptors, to approximate text-including geometrical shapes; and
- validate the text-including geometrical shapes using shape templates and a shape matching algorithm.

14. The system of claim 8, wherein the machine readable instruction set to localize the text enclosed within the plurality of closed-shaped data nodes further causes the processor to perform the following steps:
- combine approximations of text-including geometrical shapes from differently preprocessed variations of the flowchart image;
- compress the approximations to define text and shape boundaries using a non-maximum compression algorithm; and
- separate the text from the text-including geometrical shapes to determine the plurality of closed-shaped data nodes.

15. A computer program product for extracting information from a flowchart image comprising one or more of: a plurality of closed-shaped data nodes having text enclosed within, connecting lines connecting one or more of the plurality of closed-shaped data nodes and free text adjacent to the connecting lines, the computer program product comprising a non-transitory computer-readable medium storing programming instructions, which when executed by a computer, cause the computer to carry out steps comprising:
- receiving the flowchart image as an electronic image file;
- detecting the plurality of closed-shaped data nodes;
- localizing the text enclosed within the plurality of closed-shaped data nodes;
- masking the localized text within the plurality of closed-shaped data nodes to generate an annotated image;
- generating a statistical size distribution of the dimensions of characters in the free text to identify the connecting lines;
- detecting lines in the annotated image to reconstruct the lines as closed-shaped data nodes and connecting lines;
- extracting a tree frame with the plurality of closed-shaped data nodes and the detected connecting lines;
- localizing the free text adjacent to the connecting lines;
- assembling chunks of the free text oriented and positioned proximally together into text blocks using an orientation-based two-dimensional clustering;
- recognizing characters in the localized text and the text blocks using a character recognition algorithm; and
- compiling the tree frame, the localized text and the text blocks into a flow diagram file having a searchable and interactive electronic file format configured to enable the flow diagram file to have a reduced size than the electronic image file.

16. The computer program product of claim 15, wherein the programming instructions for detecting lines in the annotated image to reconstruct them as closed-shaped data nodes and connecting lines further comprises instructions to perform the following steps:
- identifying image gradients of objects on the annotated image in horizontal and vertical directions;
- detecting the lines on the annotated image as proxy for the lines approximated in horizontal and vertical directions based on the identified image gradients using an edge detection algorithm and a shape detection algorithm;
- detecting the lines on the annotated image as morphological gradients approximated in horizontal and vertical directions using a heuristically-determined kernel customized to remove non-geometrical objects and text characters from the annotated image;
- combining the lines detected based on the identified image gradients and the lines detected as morphological gradients; and
- reconstructing the lines as closed-shaped data nodes and connecting lines.

17. The computer program product of claim 15, wherein the programming instructions for extracting a tree frame with the plurality of closed-shaped data nodes and the detected connecting lines further comprises instructions to perform the following steps:
- determining whether each of the detected connecting lines is a connector or a flowline with an arrow head; and
- assembling the connecting lines based on proximity between the connecting lines, an overlap between any two connecting lines in two-dimensional space, and a geometric slope of the connecting lines.

18. The computer program product of claim 15, wherein the programming instructions for localizing the free text adjacent to the connecting lines further comprises instructions to perform the following steps:
- merging characters of the free text into blobs of free text by performing one or more morphological transformations;
- detecting contours of the blobs of free text by determining whether continuous points along edges of the blobs of free text have same pixel density and color;
- filtering the contours of the blobs of free text using a character recognition algorithm, based on having a majority of alphanumeric characters; and
- identifying chunks of the free text oriented and positioned proximally together.

19. The computer program product of claim 15, wherein the programming instructions for detecting the plurality of closed-shaped data nodes further comprises instructions to perform the following steps:
- preprocessing the flowchart image into one or more normalized images to highlight geometrical edges of each of the plurality of closed-shaped data nodes using an edge detection algorithm and one or more morphological transformations;
- detecting geometrical and non-geometrical shapes from the plurality of closed-shaped data nodes by segmenting the flowchart image using a method of connected components;

detecting geometrical and non-geometrical shapes from the plurality of closed-shaped data nodes by using a method of contour detection;

filtering out contours of the geometrical and non-geometrical shapes that do not correspond to closed-shaped data nodes using statistical filters and a character recognition algorithm;

filtering contours of the geometrical shapes, using a curve-fitting algorithm, a feature extraction algorithm and feature descriptors, to approximate text-including geometrical shapes; and validating the text-including geometrical shapes using shape templates and a shape matching algorithm.

20. The computer program product of claim 15, wherein the programming instructions for localizing the text enclosed within the plurality of closed-shaped data nodes further comprises instructions to perform the following steps:

combining approximations of text-including geometrical shapes from differently preprocessed variations of the flowchart image;

compressing the approximations to define text and shape boundaries using a non-maximum compression algorithm; and separating the text from the text-including geometrical shapes to determine the plurality of closed-shaped data nodes.

\* \* \* \* \*